(12) United States Patent
Hara et al.

(10) Patent No.: US 9,241,312 B2
(45) Date of Patent: Jan. 19, 2016

(54) RADIO COMMUNICATIONS TERMINAL AND RADIO COMMUNICATIONS METHOD

(71) Applicant: FUJITSU LIMITED, Kawasaki-shi, Kanagawa (JP)

(72) Inventors: Yasushi Hara, Kunitachi (JP); Takashi Iwabuchi, Kawasaki (JP); Masaaki Kitaguchi, Kasugai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/485,116

(22) Filed: Sep. 12, 2014

(65) Prior Publication Data

US 2015/0004991 A1    Jan. 1, 2015

Related U.S. Application Data

(63) Continuation of application No. PCT/JP2012/058013, filed on Mar. 27, 2012.

(51) Int. Cl.
*H04W 52/00* (2009.01)
*H04W 52/02* (2009.01)
*H04W 72/04* (2009.01)

(52) U.S. Cl.
CPC ...... *H04W 52/0251* (2013.01); *H04W 52/0216* (2013.01); *H04W 52/0229* (2013.01); *H04W 52/0274* (2013.01); *H04W 72/048* (2013.01)

(58) Field of Classification Search
None
See application file for complete search history.

(56) References Cited

U.S. PATENT DOCUMENTS

| 2004/0072559 | A1 | 4/2004 | Kakumaru et al. |
| 2004/0165574 | A1 | 8/2004 | Kakumaru et al. |
| 2009/0149182 | A1* | 6/2009 | Tamura ................. H04B 7/022 455/436 |
| 2009/0197646 | A1* | 8/2009 | Tamura ................. H04B 7/022 455/561 |
| 2010/0317374 | A1 | 12/2010 | Alpert et al. |
| 2011/0019555 | A1 | 1/2011 | Gotoh et al. |

(Continued)

FOREIGN PATENT DOCUMENTS

| JP | 60-9233 | 1/1985 |
| JP | 2004-128949 | 4/2004 |

(Continued)

OTHER PUBLICATIONS

Japanese Office Action dated Aug. 4, 2015 in corresponding Japanese Patent Application No. 2014-507106.

(Continued)

*Primary Examiner* — Diane Mizrahi
(74) *Attorney, Agent, or Firm* — Staas & Halsey LLP

(57) ABSTRACT

A wireless communication terminal comprises a detection section, an acquisition section and a control section. The detection section detects activation of a voice telephone service application. The acquisition section acquires wireless station information transmitted from a wireless station that is a communication partner. The control section is set so as to ensure that a wireless receiver that receives wireless station information from the wireless station is always put in the ON condition when activation of the voice telephone service application is detected by the detection section. The control section sets the reception processing interval for which wireless station information is received and processed by the wireless receiver to a first interval in accordance with the wireless station information acquired by the acquisition section. The first interval is a time interval in which reception of voice telephone service incoming calls during standby is enabled.

10 Claims, 13 Drawing Sheets

(56) References Cited

U.S. PATENT DOCUMENTS

| | | |
|---|---|---|
| 2011/0143715 A1 | 6/2011 | Labrador et al. |
| 2011/0194496 A1 | 8/2011 | Wu et al. |
| 2011/0207427 A1 | 8/2011 | Kitani et al. |
| 2011/0294504 A1 | 12/2011 | Hara et al. |
| 2014/0064173 A1 | 3/2014 | Meylan et al. |

FOREIGN PATENT DOCUMENTS

| | | |
|---|---|---|
| JP | 2004-260386 | 9/2004 |
| JP | 2004-312460 | 11/2004 |
| JP | 2005-269255 | 9/2005 |
| JP | 2009-529299 | 8/2009 |
| JP | 2010-147672 | 7/2010 |
| JP | 2011-176641 | 9/2011 |
| JP | 2011-250342 | 12/2011 |
| WO | WO 2008/032750 A1 | 3/2008 |

OTHER PUBLICATIONS

International Search Report mailed Jun. 5, 2012 in corresponding International Application PCT/JP2012/058013.

\* cited by examiner

FIG.7

| PROFILE NAME | ESSID | SIP CONNECTION INFORMATION (EXAMPLE) |
|---|---|---|
| office3F | 00001 | 1111@192.168.2.150 |
| office2F | 00002 | 2222@192.168.2.150 |
| eigyosho-1 | 00003 | NONE |
| home | 00004 | NONE |

RADIO COMMUNICATIONS TERMINAL AND RADIO COMMUNICATIONS METHOD

CROSS REFERENCE TO RELATED APPLICATIONS

This application is a continuation application of International Application PCT/JP2012/058013, filed on Mar. 27, 2012 and designating the U.S., the entire contents of which are incorporated herein by reference.

FIELD

The embodiments discussed herein are related to a radio communications terminal and a radio communications method.

BACKGROUND

Recently, in a system using radio communications terminals such as mobile telephones and smartphones, a voice communications service employing a voice over internet protocol (VoIP) and the voice communications service such as Skype (registered trademark) employing a peer-to-peer (P2P) technology are provided. Among the radio communications terminals is a terminal capable of connecting with both of a mobile telephone network such as a 3rd generation (3G) line and a wireless local area network (WLAN).

One conventional radio communications terminal has been designed to set according to an operation state of an application running on the radio communications terminal, the interval at which a beacon from an access point is received (see, e.g., Japanese Laid-Open Patent Publication No. 2004-128949). There is a method in which the access point calculates a beacon transmission period, changes the beacon transmission period to the calculated transmission period, and transmits the beacon with the changed transmission period (see, e.g., Japanese Laid-Open Patent Publication No. 2010-147672). According to this method, the beacon reception interval of the radio communications terminal becomes the beacon transmission interval of the access point. There is a radio communications terminal that receives the beacon transmitted by the access point, obtains a maximum listen interval from the beacon, and sets the maximum listen interval as the beacon reception interval (see, e.g., Published Japanese-Translation of PCT Application, Publication No. 2009-529299).

The radio communications terminal described above capable of connecting with plural networks can connect with either network and perform voice communication with the counterpart call destination radio communications terminal through a voice communications service such as VoIP and Skype. In the case of connecting with the WLAN to receive the voice communications service, the radio communications terminal can respond to a received call during a standby state by constantly remaining in a state capable of communicating with the access point, i.e., a WLAN wireless station. The radio communications terminal can maintain the state of being capable of communicating with the access point by constantly receiving the beacon transmitted by the access point.

During the standby state, if the radio communications terminal is to receive the beacon at the transmission interval of the access point, a transceiver for the WLAN has to operate frequently, arising in a problem that power consumption is increased during the standby state. On the other hand, during the standby state, if the radio communications terminal is to receive the beacon at a maximum listen interval, the beacon reception interval is too long and therefore, a delay is caused in the timing of notifying a user of a received call when there is a call is received during the standby state. For this reason, there is a problem in that it is possible that the user cannot respond to the received call.

SUMMARY

According to an aspect of an embodiment, a radio communications terminal includes a processor configured to detect that an application of a voice communications service is activated in the radio communications terminal; obtain wireless station information transmitted from a wireless station, which is a communication counterpart; and set a wireless receiver that receives the wireless station information from the wireless station to be in an always-on state and sets based on the wireless station information obtained, a reception processing interval at which the wireless receiver performs reception processing of the wireless station information, the reception processing interval being set to be a first interval, upon detecting that the application of the voice communications service is activated. The first interval is a time interval that enables an incoming call of the voice communications service to be received during a standby state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a table of an example of WLAN connection information;

DESCRIPTION OF EMBODIMENTS

Embodiments of a radio communications terminal and a radio communications method will be described in detail with reference to the accompanying drawings. The present invention is not limited by the embodiments.

Figure 1:
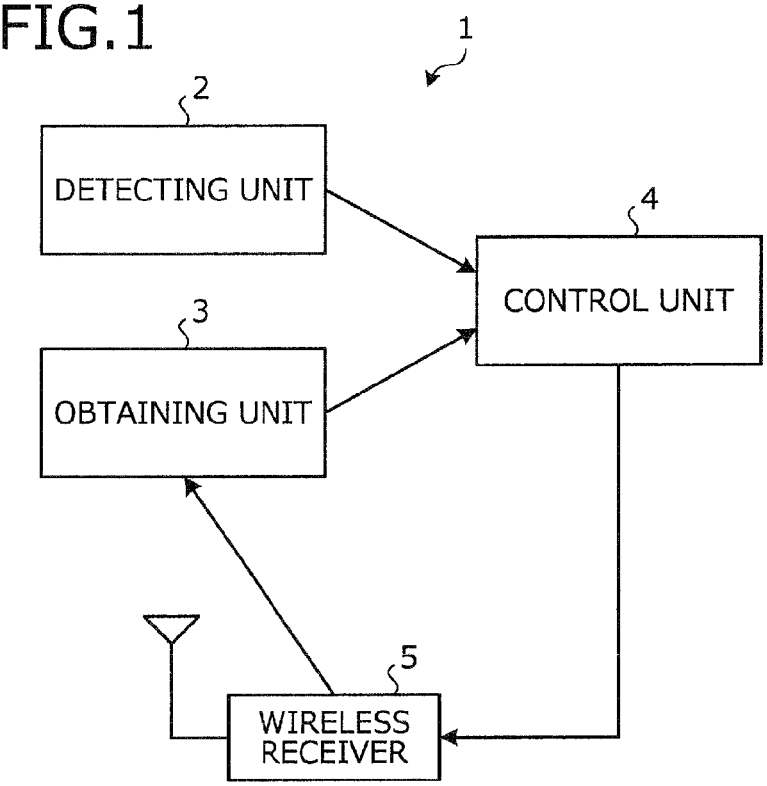
FIG. 1 is a block diagram of a radio communications terminal according to a first embodiment.

FIG. 1 is a block diagram of a radio communications terminal according to a first embodiment. As depicted in FIG. 1, a radio communications terminal 1 has a detecting unit 2, an obtaining unit 3, and a control unit 4. The detecting unit 2 detects a voice communications service application. The obtaining unit 3 obtains wireless station information transmitted from a wireless station (not depicted) that is a communication counterpart.

The control unit 4 performs setting such that a wireless receiver 5 that receives the wireless station information from the wireless station will be in an always-on state when the detecting unit 2 detects that the application of the voice communications service is activated. Based on the wireless station information obtained by the obtaining unit 3, the control unit 4 sets, at a first interval, a reception processing interval at which the wireless receiver 5 performs reception processing. The first interval is a time interval that enables an incoming call of the voice communications service to be received during the standby state.

Figure 2:
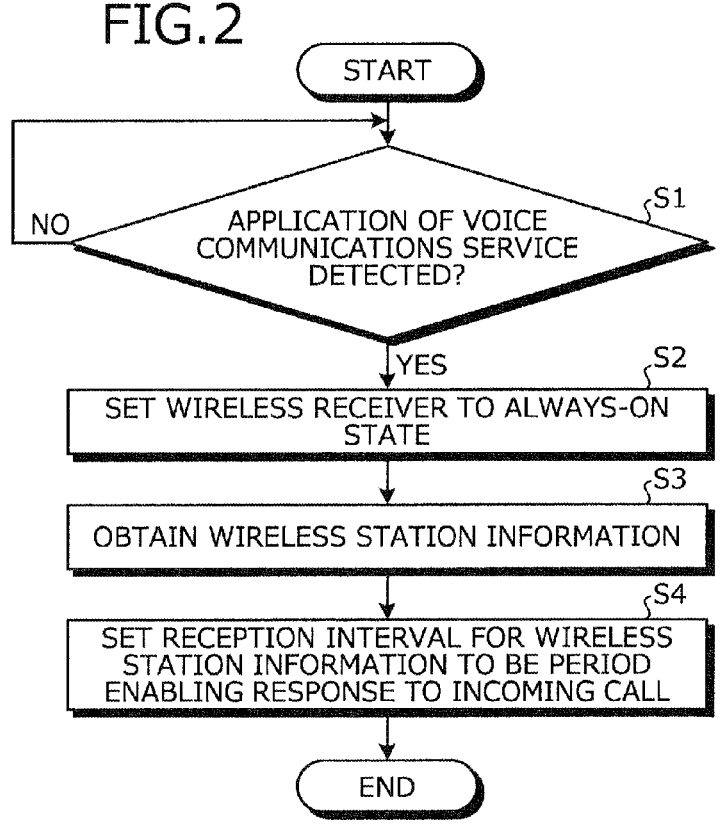
FIG. 2 is a flowchart of a radio communications method according to the first embodiment.

FIG. 2 is a flowchart of a radio communications method according to the first embodiment. As depicted in FIG. 2, when the radio communications method starts, the radio communications terminal 1 uses the detecting unit 2 to detect whether an application of the voice communications service is activated (step S1). If not (step S1: NO), the radio communications terminal 1 returns to step 1. If an application of the voice communications service is detected to be activated (step S1: YES), the radio communications terminal 1 uses the control unit 4 to perform setting such that the wireless receiver 5 that receives the wireless station information from the communication counterpart wireless station will be in the always-on state (step S2).

The radio communications terminal 1 uses the obtaining unit 3 to obtain the wireless station information transmitted by the wireless station and received by the wireless receiver 5 (step S3). The radio communications terminal 1 uses the control unit 4, to set based on the obtained wireless station information, the reception processing interval at which the wireless receiver 5 performs reception processing of the wireless station information, the reception processing interval being set such that it is possible to receive an incoming call of the voice communications service during the standby state (step S4). The radio communications terminal 1 then ends a sequence of operations. The order in which steps S2 to S4 are performed is arbitrary.

According to the first embodiment, while the voice communications service is in use, the wireless receiver is in the always-on state even in the standby state and the wireless receiver receives the wireless station information at a time interval that enables an incoming call to be received during the standby state. Thus, it becomes possible for the user of the radio communications terminal 1 to respond to an incoming call of the voice communications service during the standby state.

A second embodiment is an example of an application of the radio communications terminal 1 according to the first embodiment, to a radio communications terminal such as a mobile telephone and a smartphone. In the second embodiment, the radio communications terminal is assumed to be able to connect with plural networks of both a mobile telephone network such as a 3G line and a WLAN, for example.

In the second embodiment, the wireless station that is the communication counterpart when the radio communications terminal connects with a mobile telephone network is referred to as a base station and the wireless station that is the communication counterpart when the radio communications terminal connects with a WLAN is referred to as an access point. The radio communications terminal may be connectable to a network of a worldwide interoperability for microwave access (WiMax) (registered trademark) system or other system.

Figure 3:
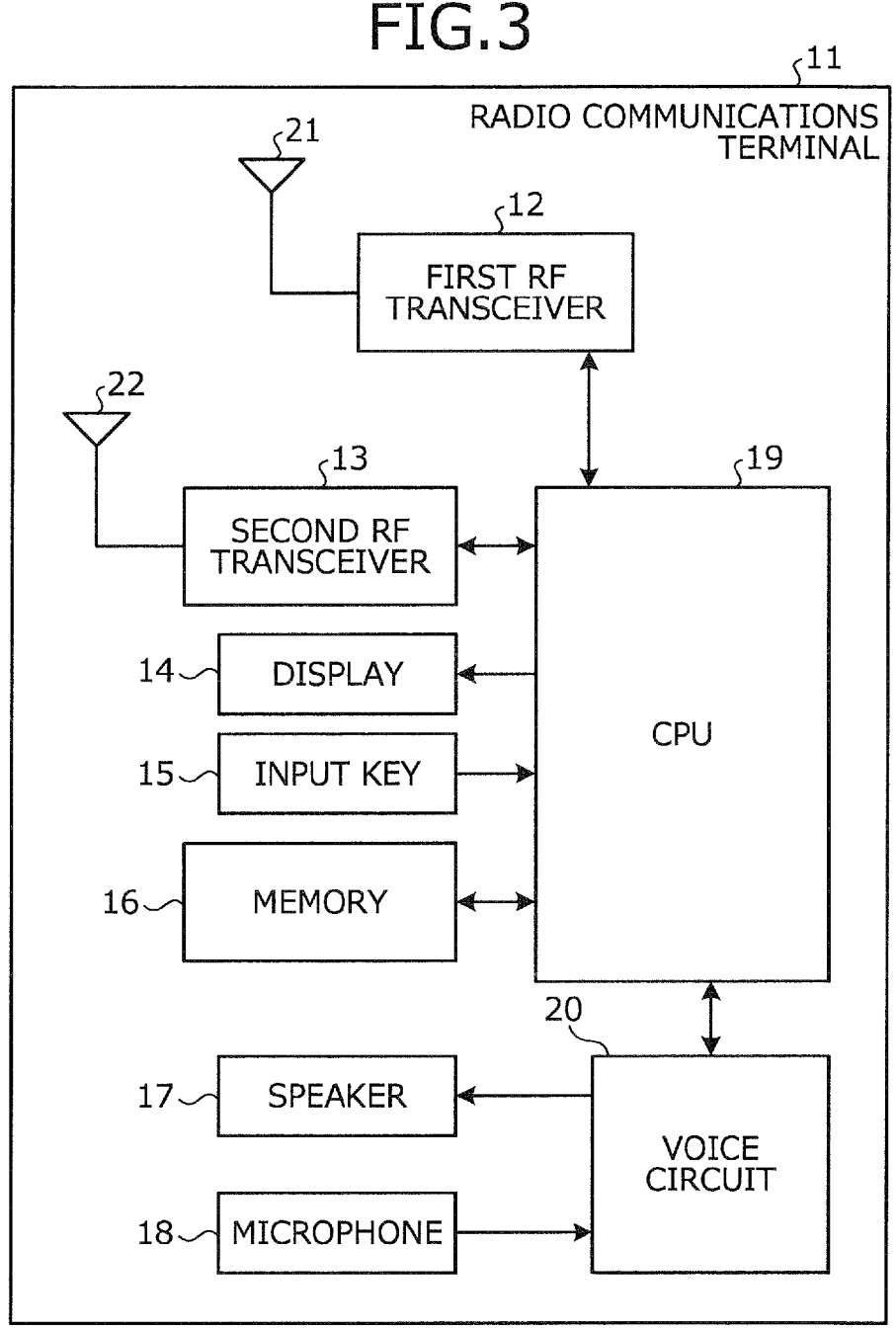
FIG. 3 is a block diagram of a hardware configuration of the radio communications terminal according to a second embodiment.

FIG. 3 is a block diagram of a hardware configuration of the radio communications terminal according to the second embodiment. As depicted in FIG. 3, a radio communications terminal 11 has a first radio frequency (RF) transceiver 12, for example, a second RF transceiver 13 as a wireless receiver, a display 14, an input key 15, memory 16, a speaker 17, a microphone 18, a central processing unit (CPU) 19, and a voice circuit 20.

The first RF transceiver 12 is connected to an antenna 21 and the CPU 19. The first RF transceiver 12 receives a radio signal from the mobile telephone network by the antenna 21, generates received data from the received signal, and transfers the data to the CPU 19. The first RF transceiver 12 generates a transmission signal from transmission data transferred from the CPU 19 and transmits the radio signal to the mobile telephone network by the antenna 21.

The second RF transceiver 13 is connected to an antenna 22 and the CPU 19. The second RF transceiver 13 receives a radio signal from the WLAN by the antenna 22, generates the received data from the received signal and transfers the data to the CPU 19. The second RF transceiver 13 generates the transmission signal from the transmission data transferred from the CPU 19 and transmits the radio signal to the WLAN by the antenna 22.

The display 14 is connected to the CPU 19. The display 14 displays characters and images, based on data output from the CPU 19. The display 14 may have a touch panel attached to the surface thereof and characters and symbols may be input through the touch panel.

The input key 15 is connected to the CPU 19. The input key 15 is used for inputting characters and symbols into the CPU 19.

The memory 16 is connected to the CPU 19. The memory 16 stores an operating system (OS) and various programs such as applications to be executed by the CPU 19. A program of the voice communications service such as, for example, VoIP and Skype can be cited as an example of an application program. The memory 16 stores connection information corresponding to the time when the radio communications terminal 11 connects to the WLAN.

The speaker 17 is connected to the voice circuit 20. The speaker 17 outputs sound, based on a signal output by the voice circuit 20.

The microphone 18 is connected to the voice circuit 20. The microphone 18 is used for inputting a voice signal into the voice circuit 20.

The voice circuit 20 is connected to the CPU 19. The voice circuit 20 generates voice data from the voice signal transferred from the microphone 18 and transfers the data to the CPU 19. The voice circuit 20 generates the voice signal from the voice data transferred from the CPU 19 and transfers the signal to the speaker 17.

The CPU executes the operating system and various programs such as applications. The CPU 19 processes the data input from the first RF transceiver 12, the second RF transceiver 13, the input key 15, the memory 16, and the voice circuit 20 and outputs the data to the first RF transceiver 12, the second RF transceiver 13, the display 14, the memory 16, and the voice circuit 20. The CPU 19 controls the overall operation of the radio communications terminal 11. The radio communications terminal 11 may have a CPU for radio communication and another CPU for execution of application programs.

Figure 4:
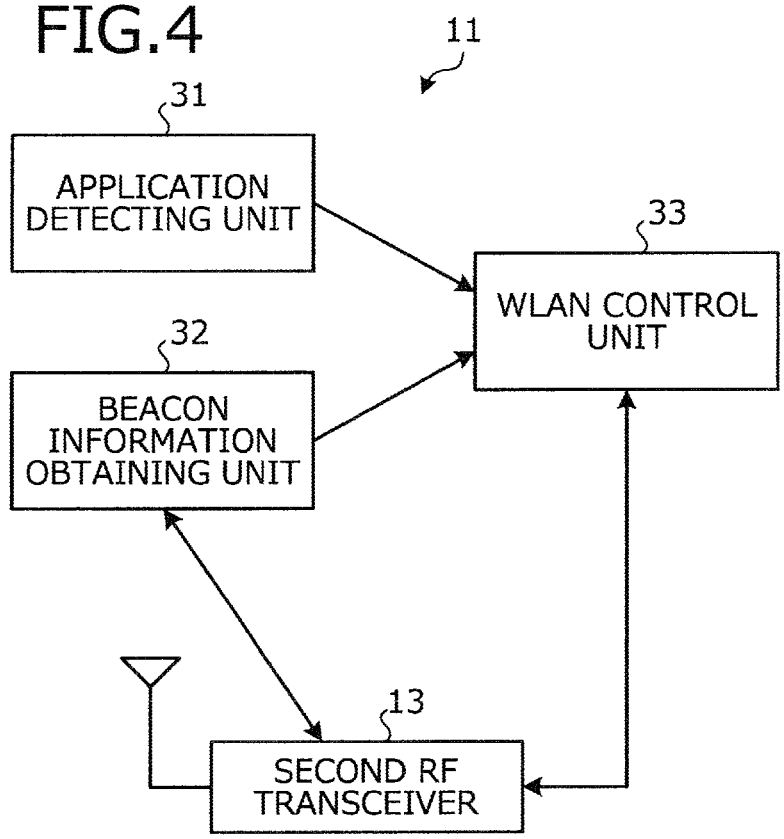
FIG. 4 is a block diagram of a functional configuration of the radio communications terminal according to the second embodiment.

FIG. 4 is a block diagram of a functional configuration of the radio communications terminal according to the second embodiment. As depicted in FIG. 4, the radio communications terminal 11 has, for example, an application detecting unit 31 as the detecting unit, for example, a beacon information obtaining unit 32 as the obtaining unit, and, for example, a WLAN control unit 33 as the control unit.

The application detecting unit 31 detects the application of the voice communications service such as the VoIP and the Skype. The application detecting unit 31 may detect whether, for example, the Skype program is activated and the terminal or the user using the terminal is authenticated by a sign-in. It may be assumed that the application detecting unit 31 has detected the application of the voice communications service by the Skype when the terminal or the user using the terminal is authenticated.

For example, a task manager to be implemented as a function of the operating system can detect that the Skype program is activated. Configuration may be such that that the activation of the Skype program will be detected by downloading an application program that implements the same function as that of the task manager from the Internet and executing the application program.

The application detecting unit 31 may detect whether information of a session initiation protocol (SIP) server that controls connection to, for example, the WLAN is stored in the terminal and the terminal is connected to the SIP server. It may be assumed that the application detecting unit 31 has detected the application of the voice communications service by VoIP when the terminal is connected to the SIP server.

The beacon information obtaining unit 32 obtains the wireless station information from a beacon. The beacon is transmitted from the access point of the WLAN and is received by the second RF transceiver 13 of the radio communications terminal 11. The beacon information obtaining unit 32 may be a function of a WLAN driver to be implemented as a function of the operating system. For example, a beacon interval value and a delivery traffic indication message (DTIM) value can be cited as an example of the wireless station information to be obtained by the beacon information obtaining unit 32.

With the beacon interval value from the access point, the radio communications terminal 11 can know the interval at which the access point transmits the beacon. For example, if the beacon interval value is 100, the beacon is transmitted from the access point every 100 milliseconds.

With the DTIM value from the access point, the radio communications terminal 11 can know the interval at which the beacon including the DTIM is transmitted. For example, if the DTIM value is 5, the DTIM is transmitted every 5 beacons from the access point. The DTIM means a traffic indication message (TIM) giving notification of the presence of data addressed to a radio client.

The WLAN control unit 33 controls the operation of the WLAN driver and the second RF transceiver 13, based on results of detection of the application by the application detecting unit 31 and the wireless station information obtained by the beacon information obtaining unit 32. The WLAN control unit 33 may be implemented by executing a program that implements the radio communications method to be described later.

When the application of the voice communications service such as VoIP and Skype is detected, the WLAN control unit 33 sets the WLAN driver and the second RF transceiver 13 to be in the always-on state. The WLAN control unit 33 sets the interval at which the beacon is to be received such that an incoming call of the voice communications service can be responded to during the standby state.

For example, the time on the order of 1 to 2.5 seconds can be cited as an example of the time that enables an incoming call to be responded to during the standby state. The interval at which the base station in the mobile telephone network such as, for example, the 3G line gives notification of position information is, for example, 2.56 seconds and therefore, the above time is sufficient for responding to an incoming call from the mobile telephone network. Further, in the mobile telephone network of a long term evolution (LTE) system, the base station gives notification of the position information, for example, every 1.28 seconds.

Namely, if the interval at which the beacon is to be received is on the order of 1 to 2.5 seconds, the radio communications terminal 11 can notify the user of an incoming call of the voice communications service during the standby state. Accordingly, the user of the radio communications terminal 11 can respond to the incoming call of the voice communications service during the standby state.

When the application of the voice communications service such as VoIP and Skype is not detected, the WLAN control unit 33 performs settings such that the WLAN driver and the second RF transceiver 13 will be in the off-state at a point in time after an elapse of a given period. The WLAN control unit 33 sets the interval at which the beacon is to be received, to be a period longer than the beacon reception interval in the case of the detection of the application of the voice communications service as described above. For example, a period on the order of 3 seconds can be cited as an example of a period that is longer than the beacon reception interval in the case of the detection of the application of the voice communications service.

Figure 5:
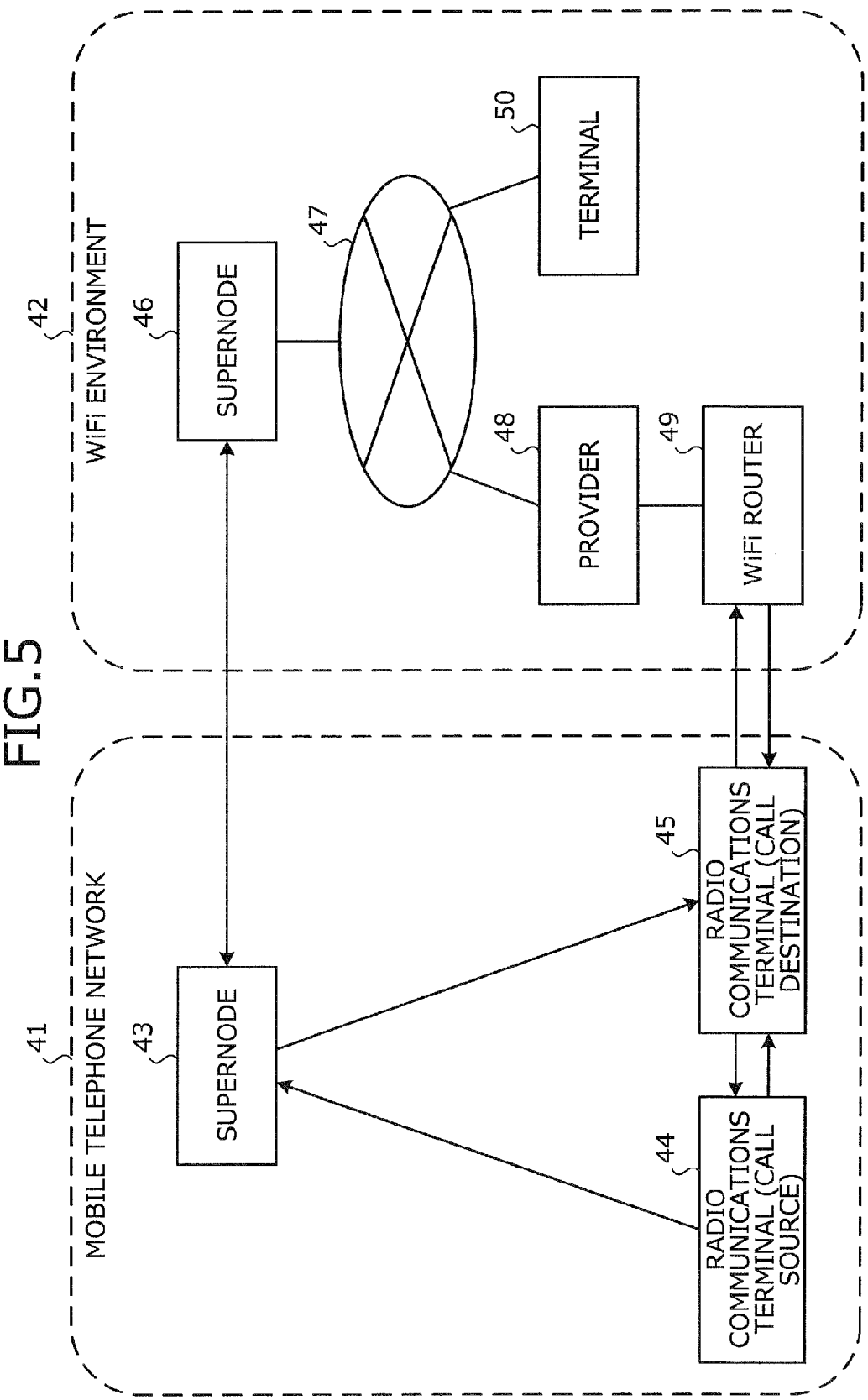
FIG. 5 is a block diagram of a system of a voice communications service by Skype.

FIG. 5 is a block diagram of a system of the voice communications service by Skype. As depicted in FIG. 5, radio communications terminals 44 and 45 can use the voice communications service by Skype in an environment 41 of the mobile telephone network such as the 3G line as well as in an environment 42 of a wireless fidelity (WiFi) (registered trademark).

When the radio communications terminal 44 as a call source makes a voice call to the radio communications terminal 45 as a call destination, using the voice communications service by Skype, the radio communications terminal 45 (call destination) is required to activate Skype, log onto a Skype server (not depicted), and sign in. The radio communications terminal 45 (call destination) is connected to a supernode 43 by way of the Internet at the time of activation of a client.

The procedure to start the voice communication by Skype is as follows. The radio communications terminal 44 (call source) transmits a call request message indicating a desire to make a call to the radio communications terminal 45 (call destination) to the supernode 43 to which the radio communications terminal 45 (call destination) is connected. Upon receiving the call request message from the radio communications terminal 44 (call source), the supernode 43 to which the radio communications terminal 45 (call destination) is connected instructs the radio communications terminal 45 (call destination) to access the radio communications terminal 44 (call source).

Upon receiving the instruction from the supernode 43, the radio communications terminal 45 (call destination) accesses the radio communications terminal 44 (call source). This enables the radio communications terminal 44 (call source)

and the radio communications terminal 45 (call destination) to start the voice communication therebetween, through a firewall (not depicted).

The radio communications terminal 44 (call source) and the radio communications terminal 45 (call destination) may be connected wirelessly to a WiFi router 49 in the WiFi environment 42. The WiFi router 49 serves as the access point of the WLAN. The WiFi router 49 is connected wirelessly or by a line to Internet 47 by way of a provider 48.

In the WiFi environment 42, a supernode 46 different from the supernode 43 in the mobile telephone network environment 41 may be connected to the Internet 47. Another terminal 50 to be connected to the supernode 46 may be connected by wire or radio to the Internet 47. If the supernode 43 to which the radio communications terminal 44 (call source) and the supernode 46 to which the radio communications terminal 45 (call destination) is connected are different, the radio communications terminal 44 (call source) transmits the call request message to the supernode 46 to which the radio communications terminal 45 (call destination) is connected, by way of the supernode 43 to which the terminal 44 is connected.

The Internet protocol (IP) address of the supernode 43 in the mobile telephone network environment 41 is different from the IP address of the supernode 46 in the WiFi environment 42. For this reason, the radio communications terminals 44 and 45, at the time of going back and forth between the mobile telephone network environment 41 and the WiFi environment 42, are required to re-perform the sign-in to the Skype server.

When the radio communications terminal is connected to the supernode 46 in the WiFi environment 42 and is in the state of waiting for an incoming call of Skype, a display screen of the radio communications terminal may be put in an off-state to suppress power consumption. Even if the screen is in the off-state, the radio communications terminal can wait for an incoming call of Skype if the WLAN driver and the WLAN RF transceiver of the radio communications terminal are in the on-state.

If the screen is in the off-state and further, the WLAN driver and the WLAN RF transceiver of the radio communications terminal are put in the off-state, however, the supernode to which the radio communications terminal is connected does not automatically switch to the supernode 43 in the mobile telephone network environment 41. For this reason, the radio communications terminal can no longer standby for an incoming call of Skype.

In the second embodiment, when the application of Skype is detected, the WLAN driver and the WLAN RF transceiver are put in the always-on state. This enables the radio communications terminal to remain standing by for an incoming call while Skype is in use.

Figure 6:
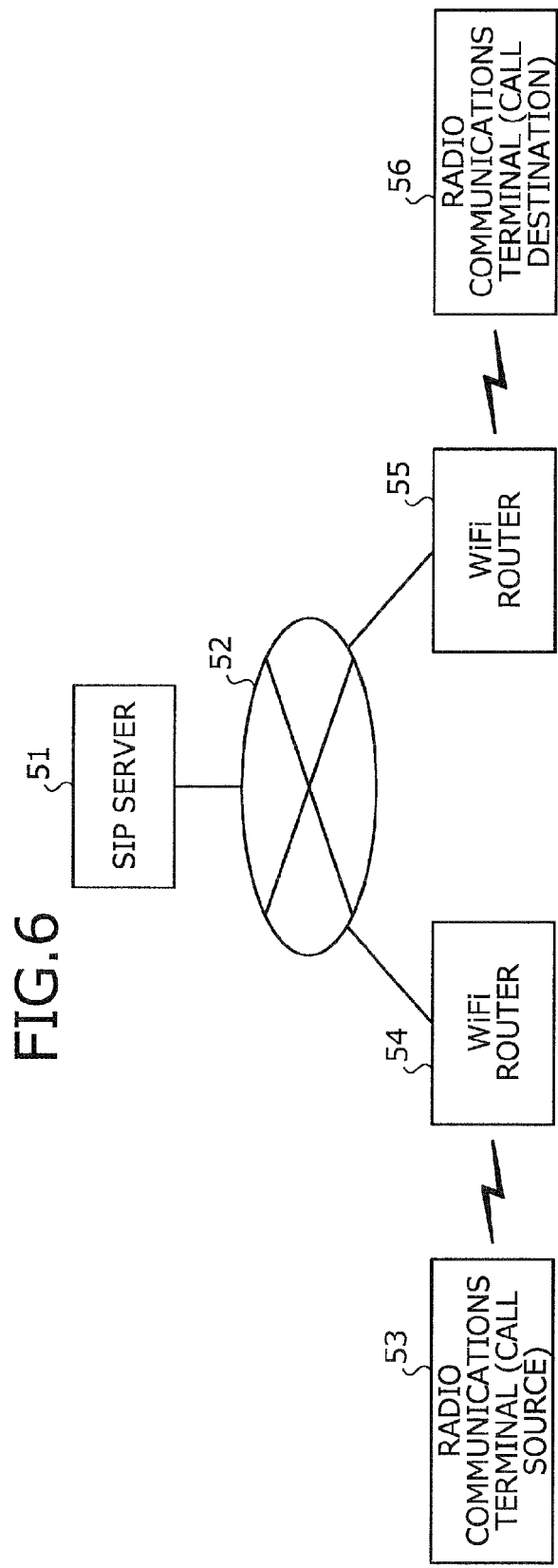
FIG. 6 is a block diagram of a system of a voice communications service by VoIP.

FIG. 6 is a block diagram of a system of the voice communications service by VoIP. As depicted in FIG. 6, the radio communications terminal 53 (call source) and the radio communications terminal 56 (call destination) connect wirelessly with WiFi routers 54 and 55 and connect with a provider or an intra-company network 52 by way of the WiFi routers 54 and 55.

The WiFi routers 54 and 55 serve as the access points of the WLAN. If the address of a SIP server 51 is registered at the access points, the radio communications terminals 53 and 56 are registered in the SIP server 51, by the radio communications terminals 53 and 56 connecting with the access points. The information for connection with the SIP server 51 is retained in the radio communications terminals 53 and 56 as WLAN connection information. The WLAN connection information may be stored in, for example, the memory 16 of the radio communications terminal 11 (see FIG. 3).

FIG. 7 is a table of an example of the WLAN connection information. As depicted in FIG. 7, WLAN connection information 59 is a data table having fields for "profile name", "extended service set identifier (ESSID)", "SIP connection information", etc., and indicates communication networks as connection candidates.

In the example depicted in FIG. 7, "office3F" and "office2F" are profiles at the time of using the voice communications service by VoIP by connecting with the SIP server 51 and have effective SIP connection information. "eigyosho-1" and "home" are the profiles at the time of using the voice communications service by, for example, Skype, without a need to connect to the SIP server, and do not have the effective SIP connection information.

Figure 8:
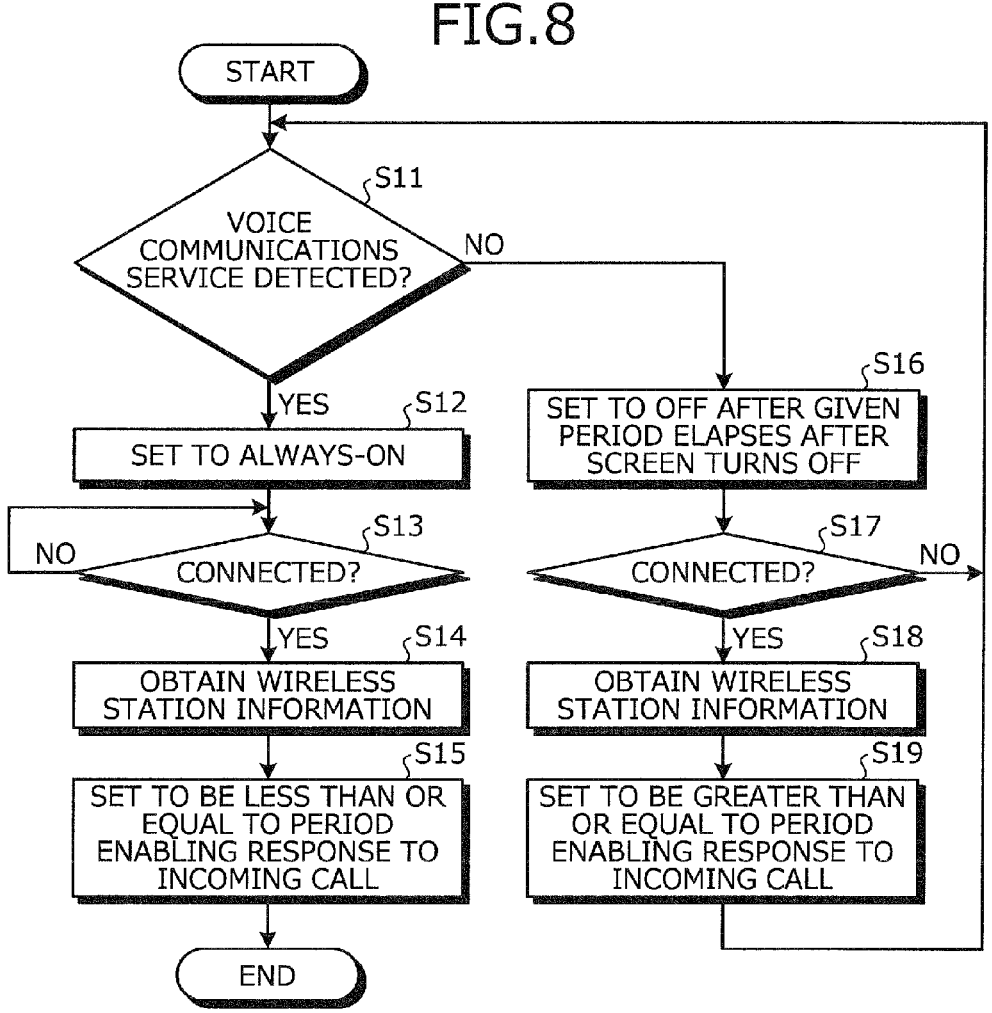
FIG. 8 is a flowchart of an example of the radio communications method according to the second embodiment.

FIG. 8 is a flowchart of an example of the radio communications method according to the second embodiment. As depicted in FIG. 8, when the radio communications method starts in the radio communications terminal 11, the WLAN control unit 33 determines whether the application of the voice communications service by Skype or VoIP has been detected by the application detecting unit 31 (step S11).

If it is determined that the application of the voice communications service has been detected (step S11: YES), then the WLAN control unit 33 sets the WLAN driver and the second RF transceiver 13 to be in the always-on state (step S12). If the radio communications terminal 11 is not connected to the WLAN (step S13: NO), the radio communications terminal 11 performs an operation of connecting to the WLAN and connects to the WLAN.

If the radio communications terminal is already connected to the WLAN or if the radio communications terminal connects to the WLAN by performing the operation of connecting thereto (step S13: YES), the WLAN control unit 33 obtains from the beacon information obtaining unit 32, the wireless station information obtained by the beacon information obtaining unit 32 (step S14). The wireless station information may be, for example, the beacon interval value and the DTIM value.

The WLAN control unit 33, based on the obtained wireless station information, sets the beacon reception interval to be less than or equal a period that enables response to an incoming call of the voice communications service during the standby state (step S15), and ends a sequence of operations.

On the other hand, if it is determined that the application of the voice communications service has not been detected (step S11: NO), the WLAN control unit 33 performs settings such that the WLAN driver and the second RF transceiver 13 will be in the off-state a given period after the screen of the display 14 of the radio communications terminal 11 is put into the off-state (step S16). If the radio communications terminal 11 is not connected to the WLAN (step S17: NO), the radio communications terminal 11 performs the operation of connecting to the WLAN and connects thereto.

If the radio communications terminal is already connected to the WLAN or if the radio communications terminal connects to the WLAN by performing the operation of connecting thereto (step S17: YES), the WLAN control unit 33 obtains the wireless station information such as the beacon interval value and the DTIM value from the beacon information obtaining unit 32 (step S18). The WLAN control unit 33, based on the obtained wireless station information, sets the beacon reception interval to be equal to or longer than the time that enables response to an incoming call of the voice communications service during the standby state, namely, a period equal to or longer than the beacon reception interval is set at step S15 (step S19). The WLAN control unit 33 returns to step 11 and repeats the operations at the steps S11 to S19.

Figure 9:
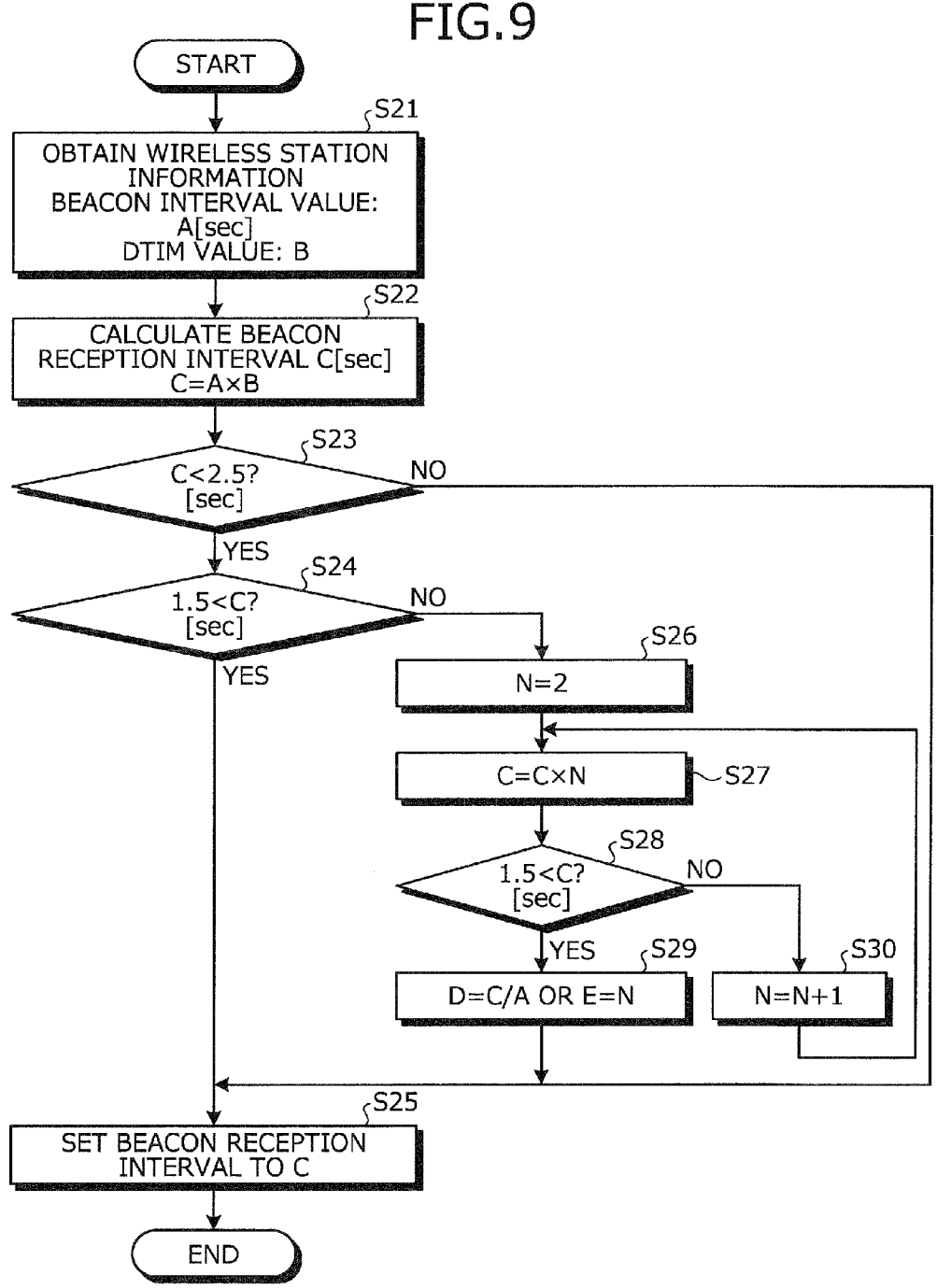
FIG. 9 is a flowchart of details of steps S14 and S15 of the flowchart depicted in FIG. 8.

FIG. 9 is a flowchart of details of steps S14 and S15 of the flowchart depicted in FIG. 8. As depicted in FIG. 9, when a beacon reception interval setting process starts, the WLAN control unit 33 obtains, for example, the beacon interval value A[sec] and the DTIM value B as the wireless station information (step S21). The WLAN control unit 33 then calculates a beacon reception interval C[sec] (step S22). A calculating formula may be, for example, [C=A×E].

The WLAN control unit 33 then determines whether the beacon reception interval C is less than, for example, 2.5[sec] (step S23). If the beacon reception interval C is less than, for example, 2.5[sec] (step S23: YES), the WLAN control unit 33 determines whether the beacon reception interval C is greater than, for example, 1.5[sec] (step S24). If the beacon reception interval C is greater than, for example, 1.5[sec] (step S24: YES), the WLAN control unit 33 sets the beacon reception interval to be C[sec] (step S25), and ends a sequence of operations.

On the other hand, if the beacon reception interval C is not greater than, for example, 1.5[sec] (step S24: NO), the beacon reception interval C is too small. When the beacon reception interval C is too small, the radio communications terminal 11 frequently receives the beacon and therefore, power consumption is increased. When the beacon reception interval C is too small, it is desirable to set the beacon reception interval to a period that enable response to an incoming call of the voice communications service during the standby state and that can suppress power consumption, by appropriately setting a listen interval value D.

Accordingly, the WLAN control unit 33 sets the repetition number N to 2 (step S26) and obtains C by calculating, for example, [C=C×N] (step S27). The WLAN control unit 33 determines whether the beacon reception interval C is greater than, for example, 1.5[sec] (step S28). If the beacon reception interval C is greater than, for example, 1.5[sec] (step S28: YES), the WLAN control unit 33 sets the listen interval value D to, for example, [C/A] or sets a DTIM listen interval value E to the repetition number N (step S29). The WLAN control unit 33 then sets the beacon reception interval to C[sec] (step S25), and ends a sequence of operations.

When, despite the setting of the repetition number N, the beacon reception interval C is not greater than, for example, 1.5[sec] (step S28: NO), the beacon reception interval is still too small and therefore, the WLAN control unit 33 calculates [N=N+1] and updates the repetition number N (step S30). The WLAN control unit 33, using a new repetition number N, calculates, for example, [C=C×N] to obtain C (step S27).

The WLAN control unit 33 repeats the updating of the repetition number N and the calculation of, for example, [C=C×N] until the beacon reception interval C becomes greater than, for example, 1.5[sec] (step S27, step S28, and step S30). If the beacon reception interval C becomes greater than, for example, 1.5[sec] (step S28: YES), then the WLAN control unit 33 sets the listen interval value D to, for example, [C/A] (step S29) and sets the beacon reception interval to C[sec] (step S25), and ends a sequence of operations.

If the beacon reception interval C is not smaller than, for example, 2.5[sec] (step S23: NO), then the WLAN control unit 33 sets C directly as the beacon reception interval (step S25), and ends a sequence of operations.

An example will be given. At step S21, it is assumed that the beacon interval value A is, for example, 100[msec] and that the DTIM value B is, for example, 5. In this case, at step S22, the beacon reception interval C becomes, for example, 500[msec] and since this value is too small, the flow at step S24 branches to NO. When the repetition number N becomes 4, the beacon reception interval C becomes 2000[msec], i.e., becomes greater than 1.5[sec]. At this time, the listen interval value D is 20 and the DTIM listen interval value E is 4.

Figure 10:
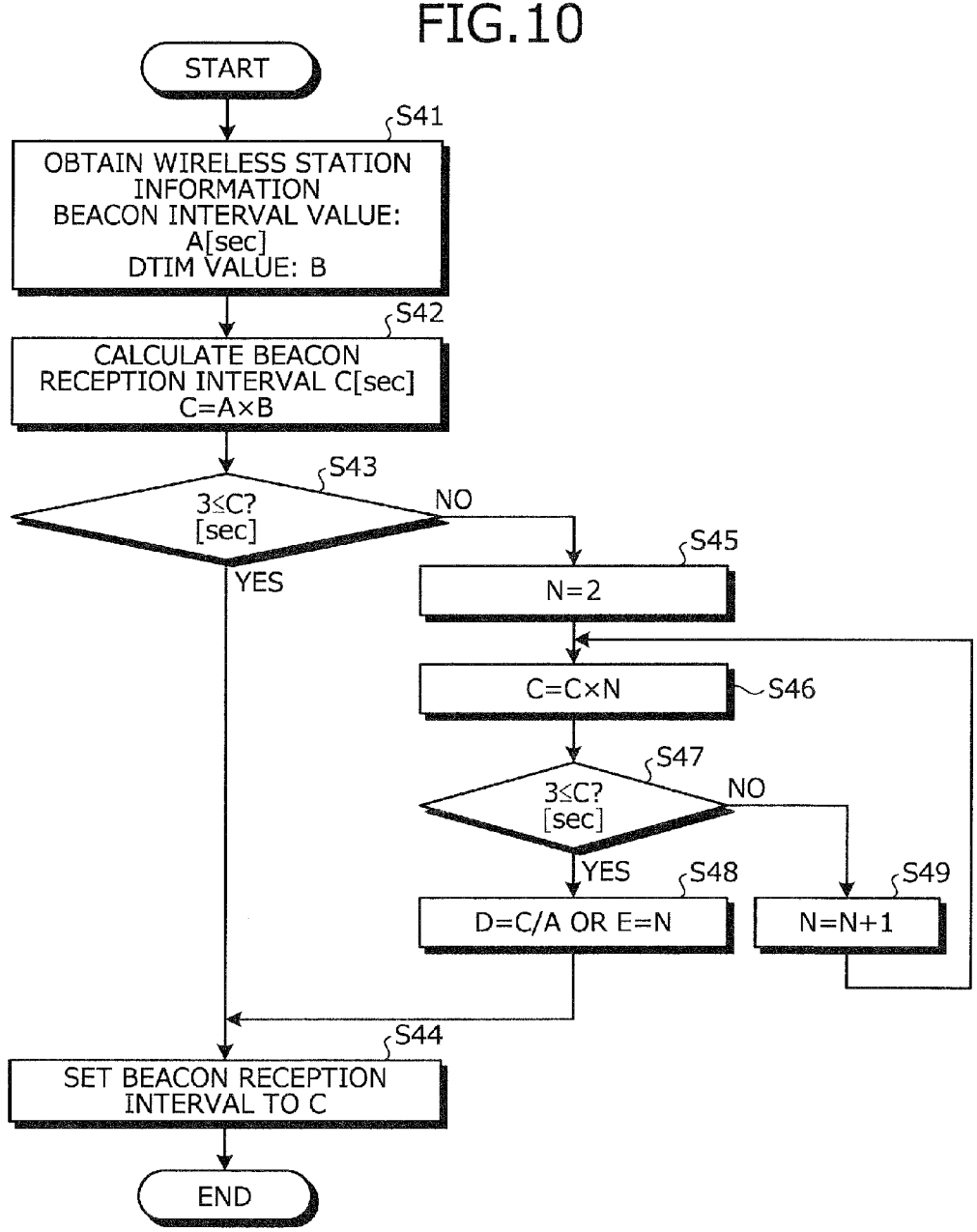
FIG. 10 is a flowchart of details of steps S18 and S19 of the flowchart depicted in FIG. 8.

FIG. 10 is a flowchart of details of the steps S18 and S19 of the flowchart depicted in FIG. 8. As depicted in FIG. 10, when the beacon reception interval setting process starts, the WLAN control unit 33 obtains, for example, the beacon interval value A[sec] and the DTIM value B as the wireless station information (step S41). The WLAN control unit 33 then calculates the beacon reception interval C[sec] (step S42). A calculating formula may be, for example, [C=A×B].

The WLAN control unit 33 then determines if the beacon reception interval C is, for example, 3[sec] or greater (step S43). If the beacon reception interval C is, for example, 3[sec] or greater (step S43: YES), the WLAN control unit 33 sets the beacon reception interval to be C[sec] (step S44), and ends a sequence of operations.

On the other hand, if the beacon reception interval C is not, for example, 3[sec] or greater (step S43: NO), the beacon reception interval C is too small. When the beacon reception interval C is too small, the beacon reception interval can be extended by appropriately setting the listen interval value D.

Accordingly, the WLAN control unit 33 sets the repetition number N at 2 (step S45) and obtains C by calculating, for example, [C=C×N] (step S46). The WLAN control unit 33 determines if the beacon reception interval C is, for example, 3[sec] or greater (step S47). If the beacon reception interval C is, for example, 3[sec] or greater (step S47: YES), the WLAN control unit 33 sets the listen interval value D to, for example, [C/A] or sets the DTIM listen interval value E to the repetition number N (step S48). The WLAN control unit 33 then sets the beacon reception interval to C[sec] (step S44), and ends a sequence of operations.

When, despite the setting of the repetition number N, the beacon reception interval C is not, for example, 3[sec] or greater (step S47: NO), the beacon reception interval is still too small and therefore, the WLAN control unit 33 calculates [N=N+1] and updates the repetition number N (step S49). The WLAN control unit 33, using a new repetition number N, calculates, for example, [C=C×N] to obtain C (step S46).

The WLAN control unit 33 repeats the updating of the repetition number N and the calculation of, for example, [C=C×N] until the beacon reception interval C becomes, for example, 3[sec] or greater (step S46, step S47, and step S49). If the beacon reception interval C becomes, for example, 3[sec] or greater (step S47: YES), then the WLAN control unit 33 sets the listen interval value D to, for example, [C/A] (step S48) and sets the beacon reception interval to C[sec] (step S44), and ends a sequence of operations.

An example will be given. At step S41, it is assumed that the beacon interval value A is, for example, 100[msec] and that the DTIM value B is, for example, 5. In this case, at step S42, the beacon reception interval C becomes, for example, 500[msec] and since this value is too small, the flow at step S43 branches to NO. When the repetition number N becomes 6, the beacon reception interval C becomes 3000[msec], i.e., becomes 3[sec] or greater. At this time, the listen interval value D is 30 and the DTIM listen interval value E is 6.

Figure 11:
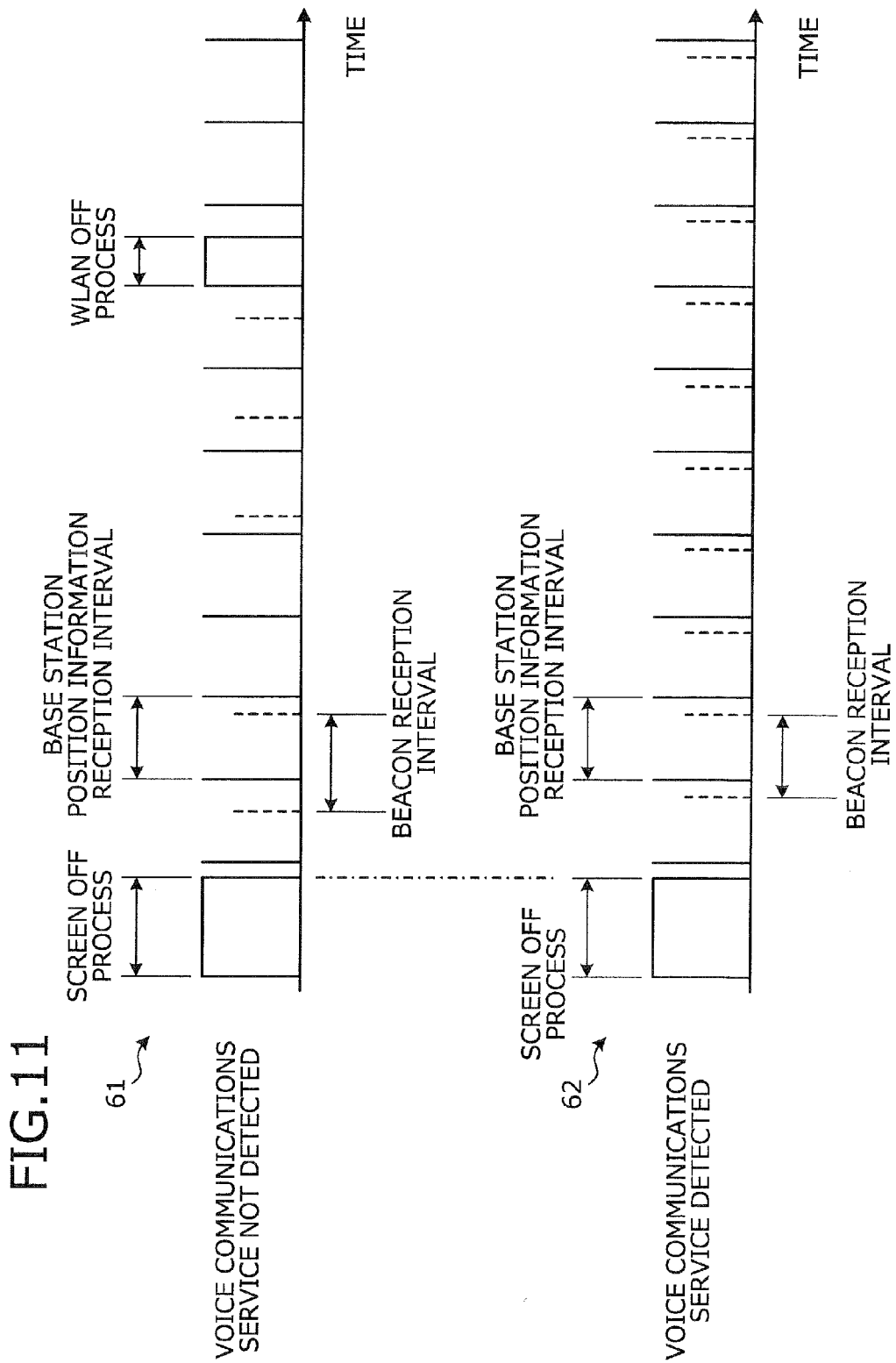
FIG. 11 is a timing chart relating a transmission interval of base station information and a reception interval of a beacon.

FIG. 11 is a timing chart relating the transmission interval of base station information and the reception interval of the beacon. In FIG. 11, a case of no detection of the voice communications service is indicated in a timing chart 61. A case of detection of the voice communications service is indicated in a timing chart 62.

"Screen off processing" indicates the process of setting the screen of the display 14 of the radio communications terminal 11 to the off-state. "WLAN off processing" indicates the process of setting the WLAN driver and the second RF transceiver 13 of the radio communications terminal 11 to the off-state. "Base station position information reception interval" indicates the interval at which the radio communications terminal 11 is to receive the position information notified by the base station in the mobile telephone network. "Beacon reception interval" indicates the interval at which the radio communications terminal 11 is to receive the beacon transmitted from the access point.

As depicted in the timing chart 61 of FIG. 11, in the case of no detection of the voice communications service, the WLAN driver and the second RF transceiver 13 of the radio communications terminal 11 are put into the off-state a given period, for example, 15 minutes, after the screen is put into the off-state. Until the WLAN driver and the second RF transceiver 13 are put into the off-state, the beacon reception interval is longer than, for example, the base station position information reception interval.

In contrast, as depicted in the timing chart 62 of FIG. 11, when the voice communications service is detected, the WLAN driver and the second RF transceiver 13 remain in the on-state even after the screen is put into the off-state and time elapses. The beacon reception interval is on the order of, for example, the base station position information reception interval.

Figure 12:
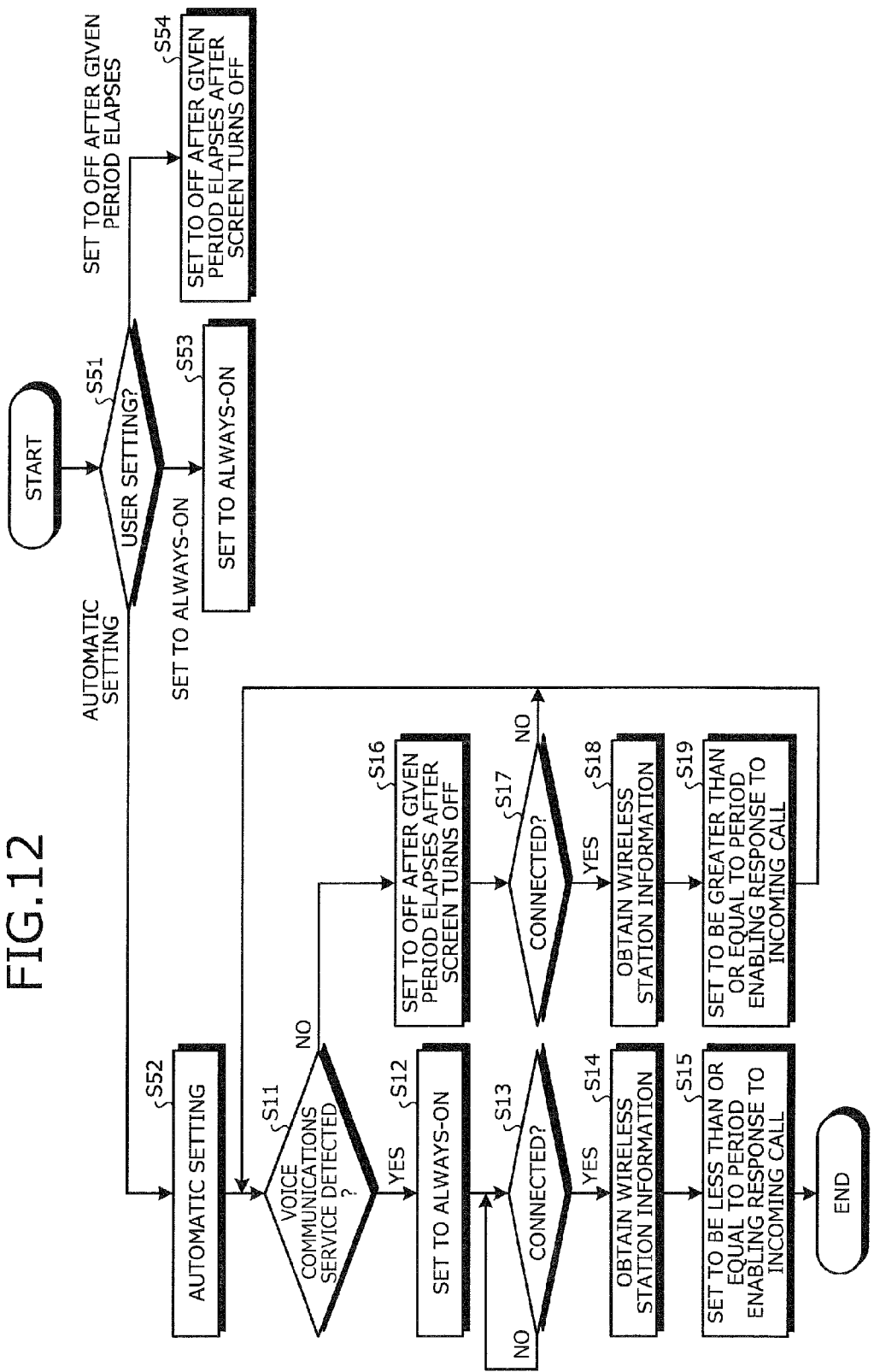
FIG. 12 is a flowchart of another example of the radio communications method according to the second embodiment.

FIG. 12 is a flowchart of another example of the radio communications method according to the second embodiment. In this example, the user sets the operation state and the WLAN control unit 33 of the radio communications terminal 11 automatically sets the beacon reception interval in the case of an automatic state.

As depicted in FIG. 12, when the radio communications method starts in the radio communications terminal 11, the WLAN control unit 33 determines the operation state set by the user (step S51). If it is determined that the user has set the automatic state (step S51: Automatic Setting), the WLAN control unit 33 puts the setting of the beacon reception interval into the automatic setting (step S52) and performs the operations at steps S11 to S19 described above. The operations at steps S11 to S19 are the same as those in the flowchart depicted in FIG. 8. Therefore, redundant description is omitted.

If it is determined that the user has set the state that puts the WLAN driver and the second RF transceiver 13 in the always-on state (step S51: Always-On Setting), the WLAN control unit 33 sets the WLAN driver and the second RF transceiver 13 to be in the always-on state (step S53). If it is determined that the user has set the state in which the WLAN driver and the second RF transceiver 13 are put into the off-state at a point in time after an elapse of a given period (step S51: Off Setting after Elapse of Given Period), the WLAN control unit 33 performs the setting corresponding thereto. Namely, the WLAN control unit 33 performs setting such that the WLAN driver and the second RF transceiver 13 will be put into the off-state a given period after the screen is put into the off-state (step S54).

Figure 13:
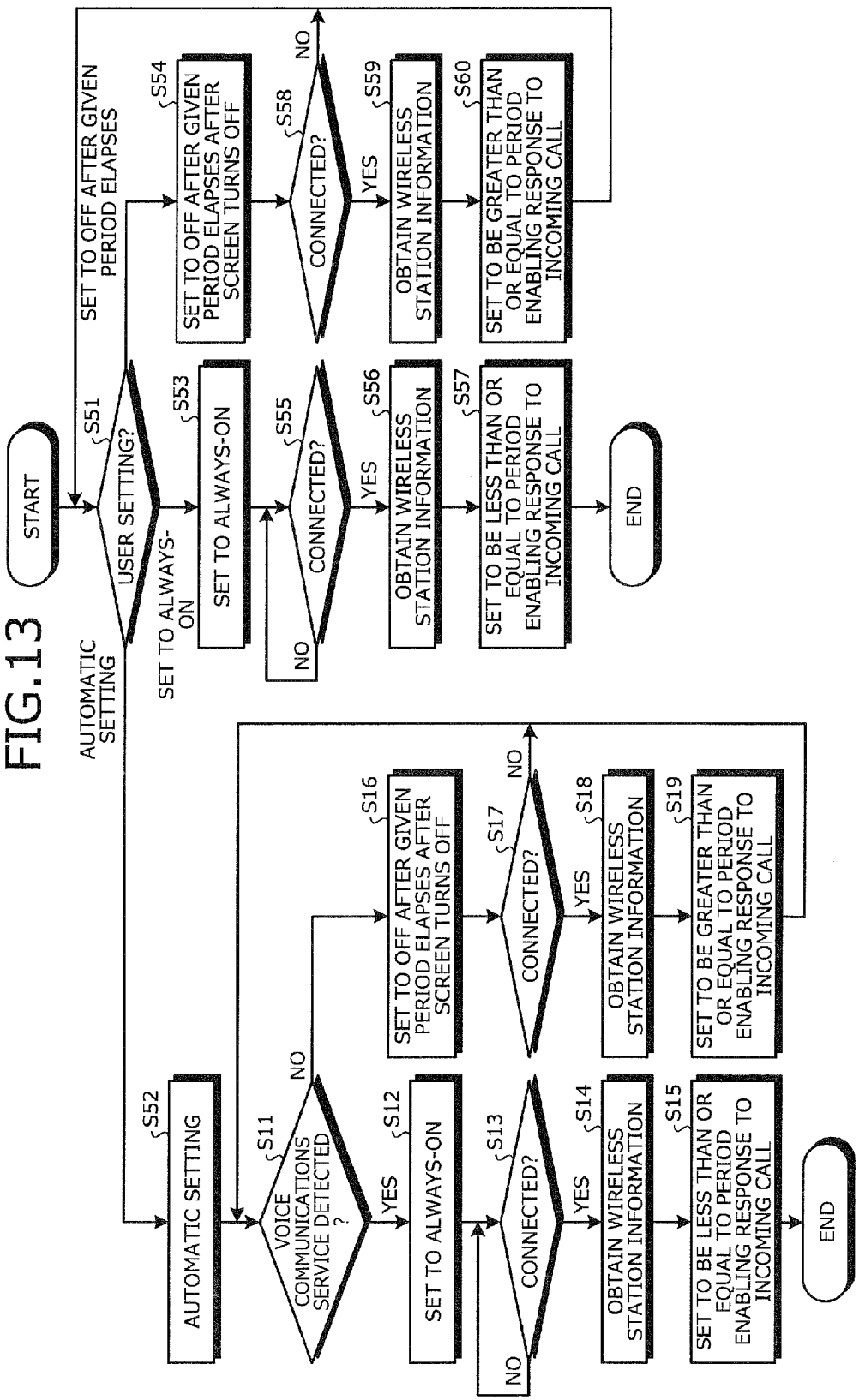
FIG. 13 is a flowchart of yet another example of the radio communications method according to the second embodiment.

FIG. 13 is a flowchart of yet another example of the radio communications method according to the second embodiment. In this example, the user sets the operation state and the WLAN control unit 33 of the radio communications terminal 11 sets the beacon reception interval, based on the set operation state.

As depicted in FIG. 13, the operations at steps S51 to S54 and the operations at steps S11 to S19 are the same as those in the flowchart depicted in FIG. 12. Therefore, the redundant description is omitted.

When, at step S53, the WLAN control unit 33 sets the WLAN driver and the second RF transceiver 13 to be in the always-on state, the radio communications terminal 11, if not connected to the WLAN (step S55: NO), performs the operation of connecting to the WLAN and connects thereto.

If the radio communications terminal 11 is already connected to the WLAN or if the radio communications terminal 11 connects to the WLAN by the operation of connecting thereto (step S55: YES), the WLAN control unit 33 obtains the wireless station information such as the beacon interval value and the DTIM value from the beacon information obtaining unit 32 (step S56). The WLAN control unit 33, based on the obtained wireless station information, sets the beacon reception interval to a period equal to or shorter than the period that enables response to an incoming call of the voice communications service during the standby state (step S57), and ends a sequence of operations.

On the other hand, at step S54, if the WLAN control unit 33 performs settings such that the WLAN driver and the second RF transceiver 13 will be put into the off-state a given period after the screen is put into the off-state, the radio communications terminal 11, if not connected to the WLAN (step S58: NO), returns to step S51 and repeats the operation at step S51 and subsequent operations.

If the radio communications terminal 11 is already connected to the WLAN (step S58: YES), the WLAN control unit 33 obtains the wireless station information such as the beacon interval value and the DTIM value from the beacon information obtaining unit 32 (step S59). The WLAN control unit 33, based on the obtained wireless station information, sets the beacon reception interval to a period equal to or longer than the period that enables response to an incoming call of the voice communications service during the standby state (step S60), returns to step S51, and repeats the operation at step S51 and subsequent operations.

According to the second embodiment, while the voice communications service is in use, the WLAN driver and the second RF transceiver 13 are in the always-on state even in the standby state and the radio communications terminal 11 receives the beacon at a time interval that makes it possible to receive an incoming call during the standby state. This enables the user of the radio communications terminal 11 to respond to an incoming call of the voice communications service during the standby state.

According to the second embodiment, the interval at which the beacon is to be received during standby for the voice communications service is longer than the interval at which the access point transmits the beacon. This makes it possible to keep the power consumption low even if the WLAN driver and the second RF transceiver 13 are in the always-on state. For example, the interval at which the beacon is to be received is on the same order as the interval at which the position information notified by the base station disposed in the mobile telephone network is to be received. This makes it possible to suppress the power consumed for receiving the beacon during standby for the voice communications service to the same level as that for the power consumed by receiving the position information notified by the base station disposed in the mobile telephone network.

Configuration may be such that the above beacon reception interval control will be performed in the standby state with the screen light-off and such that in the light-on state of the screen, the beacon reception interval control will not be performed but the beacon reception will be performed based on ordinary information from the access point.

The embodiments enable response to a received call of a voice communications service during a standby state.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communications terminal comprising a processor configured to:
    detect that an application of a voice communications service is activated in the radio communications terminal;
    obtain wireless station information transmitted from a wireless station, which is a communication counterpart; and
    set a wireless receiver that receives the wireless station information from the wireless station to be in an always-on state and sets based on the wireless station information obtained, a reception processing interval at which the wireless receiver performs reception processing of the wireless station information, the reception processing interval being set to be a first interval, upon detecting that the application of the voice communications service is activated, wherein
    the first interval is a time interval that enables an incoming call of the voice communications service to be received during a standby state.

2. The radio communications terminal according to claim 1, wherein
    the processor, upon not detecting that the application of the voice communications service is activated, performs settings such that the wireless receiver will be put in an off-state after an elapse of a given period and sets based on the wireless station information obtained, the reception processing interval to be a second interval that is greater than or equal to the first interval.

3. The radio communications terminal according to claim 1, wherein
    the processor detects that the application of the voice communications service is activated when the radio communications terminal has been authenticated with respect to the voice communications service.

4. The radio communications terminal according to claim 1, wherein
    the processor detects that the application of the voice communications service is activated when information related to a network server that controls the voice communications service is registered in the radio communications terminal.

5. The radio communications terminal according to claim 1, wherein
    the processor sets the reception processing interval to be the first interval, when a screen of the radio communications terminal is in a light-off state and the radio communications terminal is in a state of waiting for the incoming call of the voice communications service.

6. A radio communications method comprising:
    detecting that an application of a voice communications service is activated;
    setting a wireless receiver that receives wireless station information from a wireless station that is a communications counterpart, to be in an always-on state;
    obtaining the wireless station information transmitted from the wireless station; and
    setting based on the wireless station information obtained, a reception processing interval at which the wireless receiver performs reception processing of the wireless station information, the reception processing interval being set to be a first time interval that enables an incoming call of the voice communications service to be received during a standby state, wherein
    the radio communications method is performed by a radio communications apparatus.

7. The radio communications method according to claim 6, wherein
    the setting includes, when at the detecting, the application of the voice communications service being in an activated state is not detected, setting such that the wireless receiver will be put in an off-state after an elapse of a given period, and based on the wireless station information obtained, setting the reception processing interval to be greater than or equal to the first time interval.

8. The radio communications method according to claim 6, wherein
    the detecting includes detecting that the application of the voice communications service is activated when the radio communications terminal has been authenticated with respect to the voice communications service.

9. The radio communications method according to claim 6, wherein
    the detecting includes detecting that the application of the voice communications service is activated when information related to a network server that controls the voice communications service is registered in the terminal.

10. The radio communications method according to claim 6, wherein
    the setting includes setting the reception processing interval to be the first interval, when a screen of the radio communications terminal is in a light-off state and the radio communications terminal is in a state of waiting for the incoming call of the voice communications service.

* * * * *